(12) United States Patent
Yoshinaga et al.

(10) Patent No.: US 11,853,864 B2
(45) Date of Patent: Dec. 26, 2023

(54) DATA PROCESSING APPARATUS AND DATA PROCESSING METHOD FOR EXECUTING PROCESSING USING NEURAL NETWORK

(71) Applicant: CANON KABUSHIKI KAISHA, Tokyo (JP)

(72) Inventors: Motoki Yoshinaga, Yokohama (JP); Tsewei Chen, Tokyo (JP); Masami Kato, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 728 days.

(21) Appl. No.: 16/799,199

(22) Filed: Feb. 24, 2020

(65) Prior Publication Data

US 2020/0285961 A1  Sep. 10, 2020

(30) Foreign Application Priority Data

Mar. 7, 2019  (JP) ................................ 2019-041447

(51) Int. Cl.
*G06N 3/063* (2023.01)
*G06N 3/08* (2023.01)
(Continued)

(52) U.S. Cl.
CPC ........... *G06N 3/063* (2013.01); *G06F 18/213* (2023.01); *G06N 3/04* (2013.01); *G06N 3/08* (2013.01);
(Continued)

(58) Field of Classification Search
CPC ........ G06K 9/6232; G06V 10/82; G06N 3/08; G06N 3/04; G06N 3/063; G06N 3/0454
See application file for complete search history.

(56) References Cited

U.S. PATENT DOCUMENTS

2019/0205780 A1\* 7/2019 Sakaguchi ........... G06N 3/0454
2019/0251425 A1\* 8/2019 Jaffari .................... G06V 10/94
(Continued)

FOREIGN PATENT DOCUMENTS

JP  2018-67154 A   4/2018
JP  2019212206 A  12/2019

OTHER PUBLICATIONS

Diego Marcos, et al., Learning rotation invariant convolutional filters for texture classification, MultiModal Remote Sensing, Department of Geography, University of Zurich, Switzerland, ICPR, Sep. 2016.
(Continued)

*Primary Examiner* — Boubacar Abdou Tchoussou
(74) *Attorney, Agent, or Firm* — Canon U.S.A., Inc. IP Division

(57) ABSTRACT

A data processing apparatus for executing data processing using a neural network including a plurality of hierarchal levels includes an extraction unit configured to extract intermediate feature data from input feature data, a calculation unit configured to calculate output feature data by reducing the number of channels of the intermediate feature data, a storage unit configured to store the output feature data calculated by the calculation unit and provide the input feature data to the extraction unit, and a control unit configured to control the number of channels of the intermediate feature data to be extracted by the extraction unit and the number of channels of the output feature data to be calculated by the calculation unit.

17 Claims, 11 Drawing Sheets

(51) Int. Cl.
  *G06N 3/04*      (2023.01)
  *G06F 18/213*    (2023.01)
  *G06V 10/77*     (2022.01)
  *G06V 10/82*     (2022.01)

(52) U.S. Cl.
  CPC .......... *G06V 10/7715* (2022.01); *G06V 10/82* (2022.01)

(56) References Cited

U.S. PATENT DOCUMENTS

| | | | |
|---|---|---|---|
| 2020/0175313 A1* | 6/2020 | Jang | G06N 3/08 |
| 2021/0182077 A1* | 6/2021 | Chen | G06V 20/00 |
| 2021/0224125 A1* | 7/2021 | Liu | G06F 7/5443 |
| 2021/0264232 A1* | 8/2021 | Kim | G06N 3/063 |

OTHER PUBLICATIONS

Hao Li et al, "Pruning Filters for Efficient ConvNets", arXiv: 1608.08710v1, Aug. 31, 2016, p. 1-9.

* cited by examiner

DATA PROCESSING APPARATUS AND DATA PROCESSING METHOD FOR EXECUTING PROCESSING USING NEURAL NETWORK

BACKGROUND OF THE INVENTION

Field of the Invention

The present disclosure relates to a data processing apparatus and a data processing method for executing processing using a neural network.

Description of the Related Art

A hardware implementation technique for efficiently processing a convolutional neural network (hereinafter referred to as a "CNN") while reducing its circuit size is required. The CNN is known as a method used in deep learning and exerts excellent performance mainly in the task of image recognition. To enhance the accuracy of image recognition (hereinafter referred to as "recognition performance") using the CNN, the number of hierarchical levels (hereinafter referred to as "layers") of the CNN needs to be increased, or the number of pieces of feature data (hereinafter referred to as "the number of channels") per layer needs to be increased.

An obstacle to the enhancement of the recognition performance of CNN operation processing hardware while reducing its circuit size include an increase in the usage of a memory for storing the feature data (hereinafter referred to as a "feature data memory"). In the case of the CNN, the "feature data" refers to the result of a convolution operation on each hierarchical level. A calculation formula for obtaining i-th feature data $X^{L+1}_i$ of a next layer L+1 from feature data $X^L_0, X^L_1, X^L_2 \ldots$ of a certain layer L is represented by formula (1).

$$X^{L+1}_i = \phi\left(\sum_j^{N_{CH}} (W^L_{i,j} * X^L_j) + b^L_i\right) \quad (1)$$

In formula (1), $W^L_{i,j}$ is a convolution filter coefficient (hereinafter referred to as a "coefficient"), and $b^L_i$ is a bias term. * represents a convolution operation, and $\Phi$ represents an activation function. To achieve processing represented by formula (1) using the hardware, a memory for storing the input values $X^L_0, X^L_1, X^L_2, \ldots, X^L_{N_{CH}-1}$ and the operation result $X^{L+1}_i$ is required. At this time, the usage of the feature data memory is proportional to the number of channels $N_{CH,L}$ in the layer L. Thus, to enhance the recognition performance, it is necessary to increase the usage of the feature data memory.

Examples of a method for increasing the number of channels while reducing the usage of the feature data memory include a method for reducing the data size of the feature data by pooling. In the publication of Japanese Patent Application Laid-Open No. 2018-67154, max pooling in a spatial direction is performed on neighboring pixels in feature data, thereby reducing the usage of a memory per channel of the feature data. In "Learning rotation invariant convolutional filters for texture classification", D. Marcos et al., ICPR (2016), max pooling in a channel direction is performed on a plurality of pieces of feature data of different channels at the same pixel position, thereby reducing the number of channels of the feature data.

If the data size of the feature data is reduced by pooling, it is possible that the recognition accuracy decreases. In the method using the pooling in the spatial direction discussed in the publication of Japanese Patent Application Laid-Open No. 2018-67154, every time the processing is performed across hierarchical levels, the resolution of the feature data decreases. This decreases the accuracy in correctly estimating information such as the size and the position of a recognition target.

Even if the data size of the feature data is reduced by the pooling, the usage of the feature data memory cannot necessarily be reduced. In the method using the pooling in the channel direction discussed in the above article of D. Marcos et al., resolution of the feature data does not change. Thus, it is possible to avoid the above situation that the recognition accuracy decreases. Meanwhile, even in a case where the pooling in the channel direction is performed, when the feature data before being subjected to the pooling is held in the feature data memory, the usage of the feature data memory increases.

SUMMARY OF THE INVENTION

According to an aspect of the present disclosure, a data processing apparatus for executing data processing using a neural network including a plurality of hierarchal levels includes an extraction unit configured to extract intermediate feature data from input feature data, a calculation unit configured to calculate output feature data by reducing the number of channels of the intermediate feature data, a storage unit configured to store the output feature data calculated by the calculation unit and provide the input feature data to the extraction unit, and a control unit configured to control the number of channels of the intermediate feature data to be extracted by the extraction unit and the number of channels of the output feature data to be calculated by the calculation unit.

Further features of the present disclosure will become apparent from the following description of exemplary embodiments with reference to the attached drawings.

DESCRIPTION OF THE EMBODIMENTS

With reference to the drawings, suitable exemplary embodiments of the present disclosure will be described in detail below.

Figure 1:
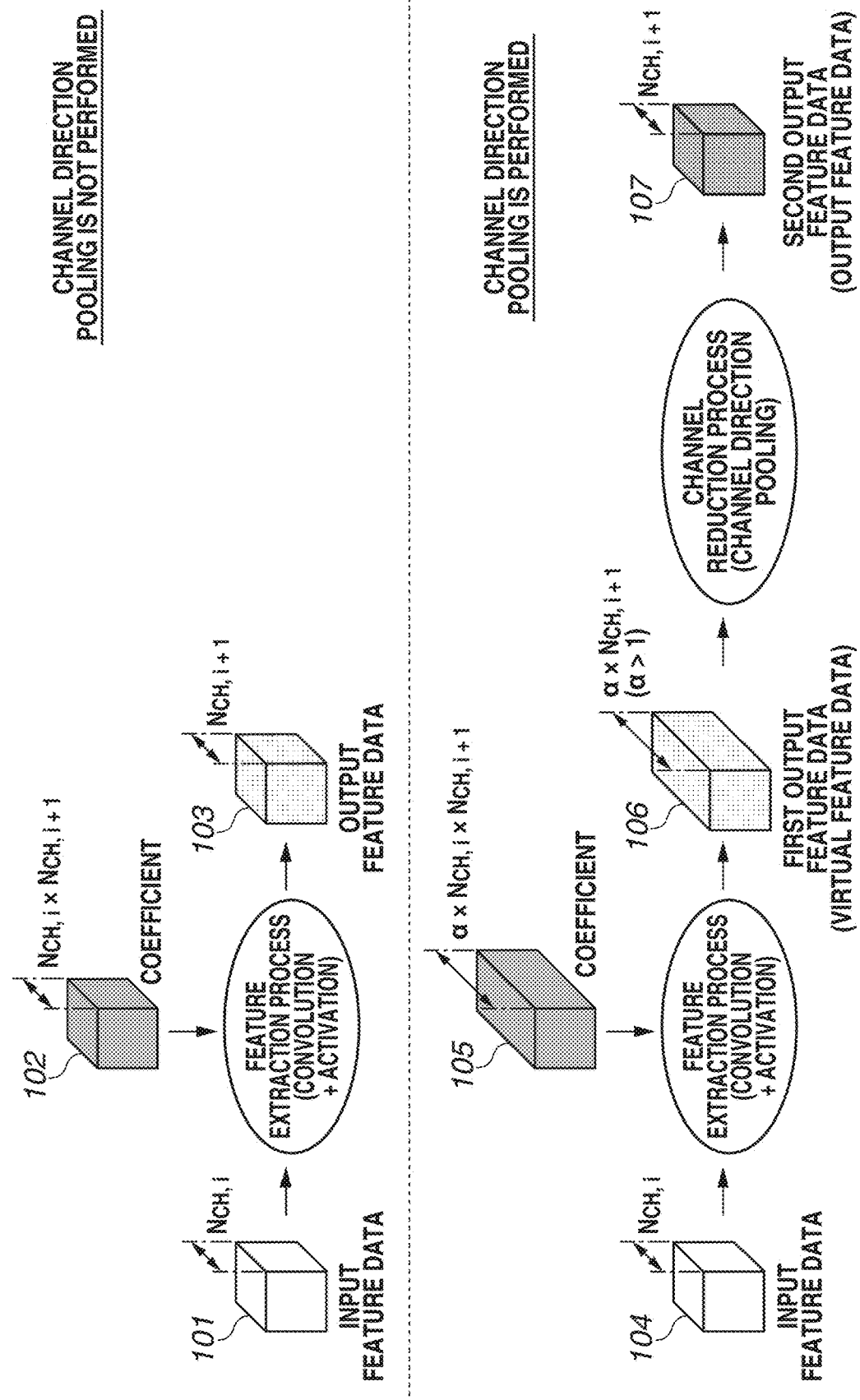
FIG. 1 is a conceptual diagram of feature data processing according to first and second exemplary embodiments.

FIG. 1 illustrates feature data processing in a case where feature data of a layer l+1 is calculated from feature data of a layer l. In normal feature data processing, a feature extraction process such as a convolution operation represented by formula (1) and an activation process is performed using input feature data 101 and a coefficient 102, thereby obtaining output feature data 103 of $N_{CH,l+1}$ channels. At this time, $N_{CH,l}$ represents the number of channels of the feature data of the layer l. The feature data processing for one layer is obtained by adding processing such as quantization to the feature extraction process where necessary, and a neural network having a plurality of layers is configured.

In feature data processing using "channel direction pooling" as described below, the feature extraction process is performed using input feature data 104 and a coefficient 105, thereby obtaining first output feature data 106 in which the number of channels is α times as many as a normal number. Further, a channel reduction process is performed on the first output feature data 106, thereby obtaining second output feature data 107. For example, the feature data obtained by the convolution operation includes many pixels having a value of 0 and therefore has a small amount of information. Thus, by applying the channel direction pooling to the first output feature data 106 of $\alpha \times N_{CH,l+1}$ channels obtained by the convolution operation, it is possible to obtain the second output feature data 107 of $N_{CH,l+1}$ channels having a greater amount of information than normal. This can improve the recognition performance of a neural network without increasing the number of channels of an output layer.

A feature data processing apparatus based on first and second exemplary embodiments achieves the feature data processing illustrated in FIG. 1 without holding the first output feature data 106 in a feature data memory. For ease of description, hereinafter, the first output feature data 106 that is not held in the feature data memory will be referred to as "virtual feature data (or intermediate feature data)", and the second output feature data 107 that is held in the feature data memory will be referred to as "output feature data". Channels of input feature data, virtual feature data, and output feature data will be referred to as an "input channel", a "virtual channel", and an "output channel", respectively. An apparatus and a method for achieving the above according to the first and second exemplary embodiments will be described in detail based on the drawings.

In the first exemplary embodiment, as the simplest example, feature data processing using the channel direction pooling is performed in a case where α=2. One example of an apparatus and a method for achieving the feature data processing using the channel direction pooling will be illustrated. The first exemplary embodiment is directed to, by the following apparatus and method, improving the recognition accuracy of the neural network without increasing the usage of the feature data memory.

Figure 2:
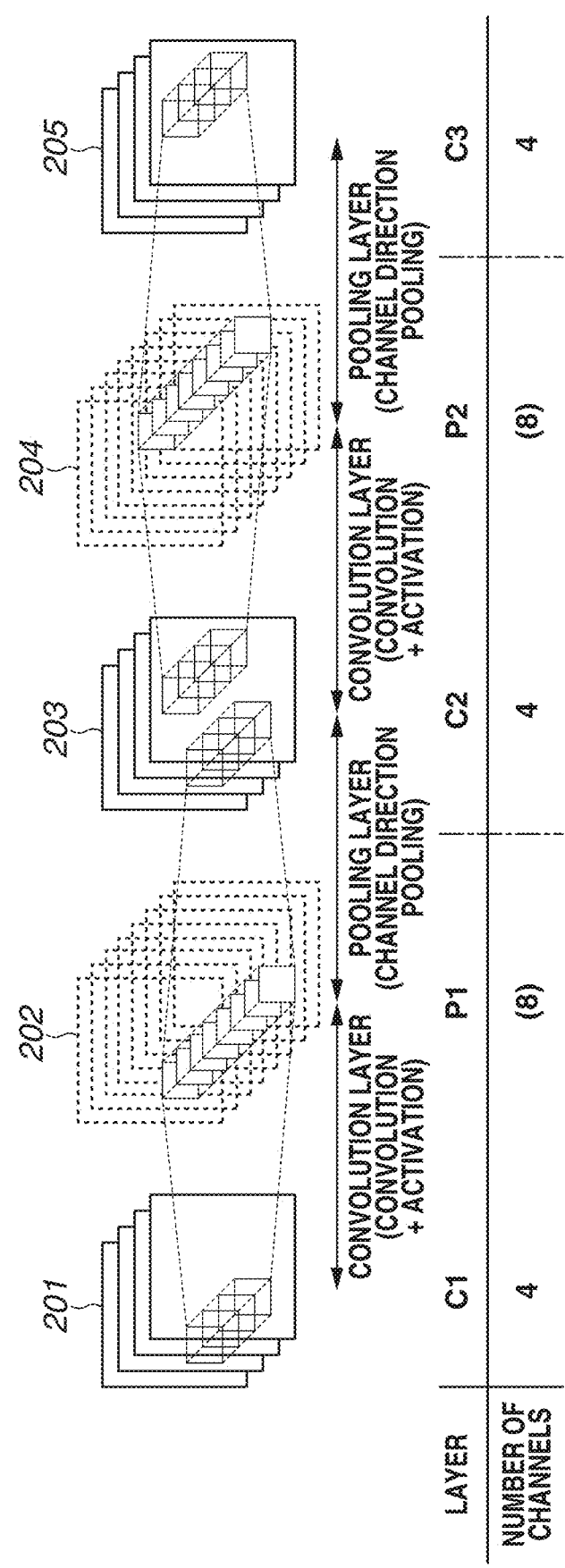
FIG. 2 is a diagram illustrating an example of a structure of a processing target network according to the first exemplary embodiment.

FIG. 2 illustrates an example of a structure of the neural network as a processing target (hereinafter referred to as a "network"). The network illustrated in FIG. 2 includes three hierarchical levels, namely layers C1, C2, and C3, and two hierarchical levels, namely layers P1 and P2, between the layers C1, C2, and C3. A number of each of channels $N_{CH,1}$, $N_{CH,2}$, and $N_{CH,3}$ in the layers C1, C2, and C3, is four. For ease of description, the numbers of pixels per channel of feature data are all equal to each other, and the bit widths of the pixel values are all equal to each other.

The layers C1 and C2, and C3 and the layers P1 and P2 are subjected to different processes. The layers C1, C2, and C3 are referred to as "convolution layers" and subjected to a convolution operation represented by formula (1) and an activation process as a feature extraction process. The layers P1 and P2 are referred to as "pooling layers" and subjected to "channel direction pooling" described below as a channel reduction process. Based on the above, while the feature extraction process and the channel reduction process are alternately performed, the feature data is sequentially calculated from the previous layer to the subsequent layer.

In the feature extraction process as performed in the processing represented by formula (1), a coefficient is used. The coefficient is determined in advance. The process is referred to as "learning". In the learning, image recognition is performed on image data, and the coefficient is updated according to the recognition result. A description will be given below of a learning method used in a case where the channel direction pooling is performed.

Figure 3:
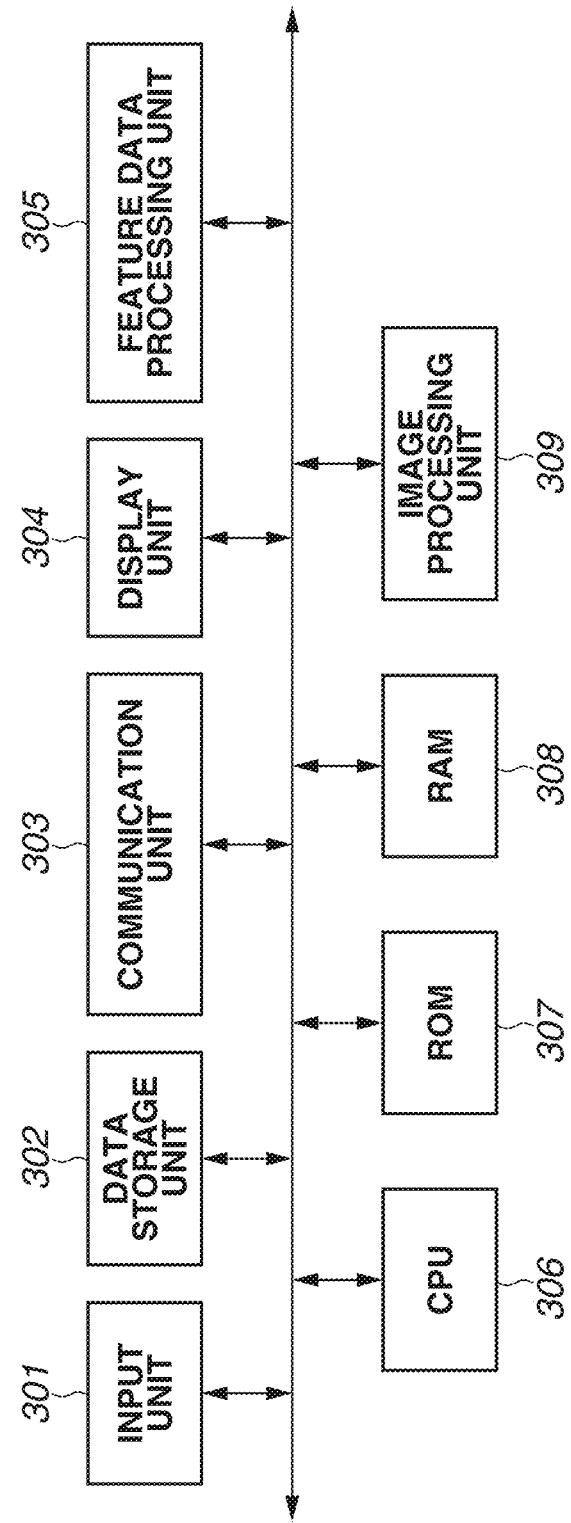
FIG. 3 is a diagram illustrating an example of a configuration of a data processing apparatus according to the first and second exemplary embodiments.

FIG. 3 is a block diagram illustrating an example of the configuration of a data processing apparatus including the feature data processing apparatus according to the present disclosure. Components will be described below.

A data storage unit 302 is a unit that saves image data. Normally, the data storage unit 302 is composed of a hard disk, a flexible disk, a Compact Disc Read-Only Memory (CD-ROM), a Compact Disc Read-Only Memory (CD-R), a digital versatile disc (DVD), a memory card, a Compact-Flash (CF) card, a smart medium, a Secure Digital (SD) card, a memory stick, an xD-Picture Card, or a Universal Serial Bus (USB) memory. The data storage unit 302 can also save a program and other data as well as the image data. Alternatively, a part of a random-access memory (RAM) 308 may be used as the data storage unit 302 as described below. Yet alternatively, the data storage unit 302 may be virtually configured using a storage device of a device to which the apparatus is connected via a communication unit 303 as described below.

A display unit 304 is a device that displays an image before and after being subjected to image processing, or an image of a graphical user interface (GUI). Generally, a cathode ray tube (CRT) or a liquid crystal display is used. Alternatively, the display unit 304 may be a display device outside the apparatus and connected to the apparatus by a cable.

An input unit 301 is a device to which an instruction from a user and data are input, and includes a keyboard, a pointing device, and a button. Alternatively, the display unit 304 and the input unit 301 may be the same device as a known touch screen device. In this case, an input provided through a touch screen is treated as an input to the input unit 301.

A communication unit 303 is an interface (I/F) via which devices communicate with each other. In FIG. 3, the input unit 301, the data storage unit 302, and the display unit 304 are all included within a single apparatus. Alternatively, these components may be connected together through communication paths according to a known communication method to form such a configuration as a whole.

A central processing unit (CPU) 306 controls the operation of the entirety of the apparatus. A read-only memory (ROM) 307 and a RAM 308 provide the CPU 306 with a program, data, and a work area required for the processing of the CPU 306. If a program required for the processing described below is stored in the data storage unit 302 or the ROM 307, the program is temporarily loaded into the RAM 308 and then executed. Alternatively, if the apparatus receives the program via the communication unit 303, the program is temporarily recorded in the data storage unit 302 and then loaded into the RAM 308. Yet alternatively, the program may be directly loaded from the communication unit 303 into the RAM 308 and then executed. FIG. 3 illustrates a configuration in which only one CPU (the CPU 306) is provided. Alternatively, a configuration may be employed in which a plurality of CPUs is provided.

An image processing unit 309 receives a command from the CPU 306, reads image data written in the data storage unit 302, and adjusts the range of pixel values. The image processing unit 309 writes the result of the processing to the RAM 308.

A feature data processing unit 305 receives the result of image processing saved in the RAM 308, performs the feature extraction process and the channel reduction process according to flowcharts described below and returns the results of the processes to the RAM 308. The feature data processing unit 305 includes a feature extraction processing unit that performs the convolution operation corresponding to formula (1) and the activation process. The feature data processing unit 305 also includes a storage device that holds feature data, i.e., a feature data memory. The feature data processing unit 305 further includes a channel reduction processing unit that performs channel direction pooling described below on the feature data.

Based on the result of the processing of the feature data processing unit 305, the CPU 306 performs image processing or image recognition on a moving image (an image having a plurality of frames). The processing result of the CPU 306 is saved in the RAM 308.

In the system configuration of the apparatus according to the present exemplary embodiment, various components also exist in addition to the above components, but they are not the main point of the present disclosure and therefore are not described.

Figure 4:
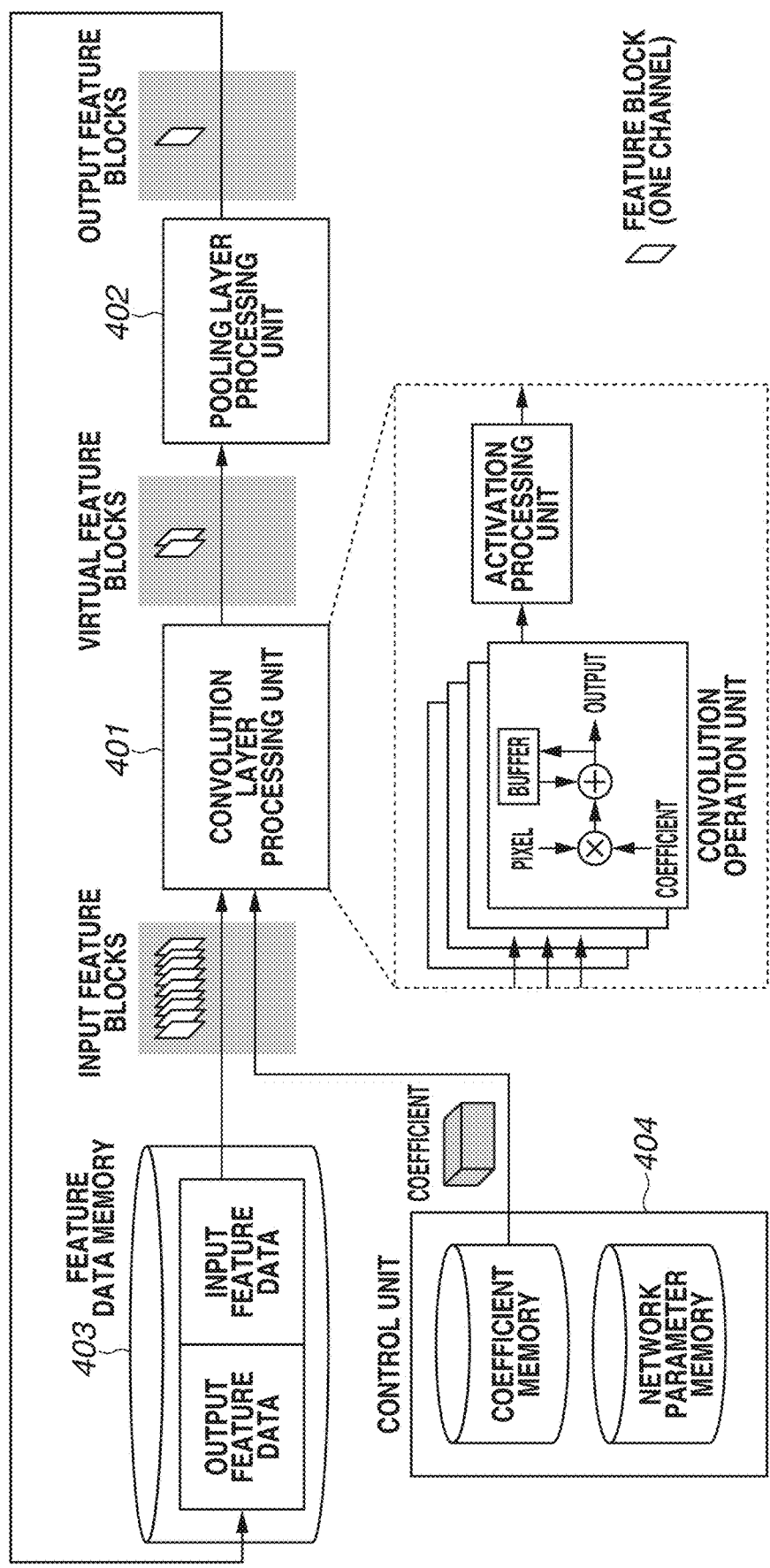
FIG. 4 is a block diagram illustrating a configuration of a feature data processing unit according to the first exemplary embodiment.

FIG. 4 illustrates an example of the configuration of the feature data processing unit 305. As described above, the feature data processing unit 305 performs the feature extraction process and the channel reduction process illustrated in FIG. 1. A convolution layer processing unit 401 performs the feature extraction process, thereby calculating virtual feature data from input feature data. A pooling layer processing unit 402 performs the channel reduction process, thereby calculating output feature data from the virtual feature data. The feature data processing unit 305 also includes a feature data memory 403 and a control unit 404 that assigns a required coefficient to the convolution layer processing unit 401.

In the feature data processing unit 305, feature data processing is performed in units which are termed "feature blocks". The feature blocks are units obtained by dividing feature data into certain sizes in a spatial direction. The advantages of the processing in feature block units include the small data size in each processing unit. By making the input and output data sizes of the convolution layer processing unit 401 and the pooling layer processing unit 402 smaller, it is possible to make the circuit sizes of these components smaller.

In the feature data processing unit 305, input feature blocks are read from the feature data memory 403, and virtual feature blocks of two channels are calculated. An output feature block of one channel is further calculated from the virtual feature blocks of two channels and written to the feature data memory 403. By repeating the above processing, output feature data of all the channels is calculated. The details of the components and the relationships between the components are described below.

The pooling layer processing unit 402 performs channel direction pooling as the channel reduction process. The pooling layer processing unit 402 receives virtual feature blocks of two channels and calculates an output feature block of one channel.

Figure 5:
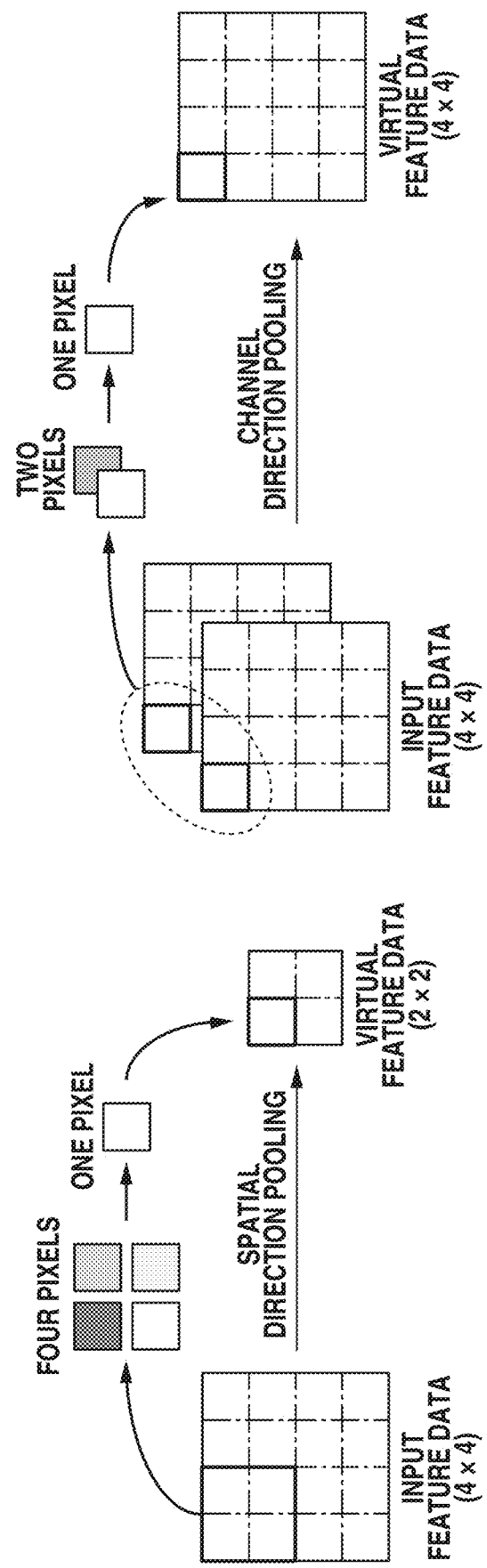
FIG. 5 is a diagram illustrating an example of processing performed by a channel reduction processing unit according to the first exemplary embodiment.

FIG. 5 illustrates general pooling, i.e., spatial direction pooling, and the processing of the channel direction pooling performed by the pooling layer processing unit 402. In the spatial direction pooling, first, feature data 502 of four pixels is extracted from feature data 501. Then, feature data 503 of one pixel is obtained from the feature data 502 of four pixels. By repeating the above processing at different positions, feature data 504 is obtained. Examples of the method for obtaining the feature data 503 of one pixel include a method for taking the maximum value or the average value of the feature data 502 of four pixels.

The channel direction pooling is different from the spatial direction pooling in the method for extracting feature data. That is, feature data 506 of two pixels is obtained by collecting pixels at the same position from feature data 505 of two channels. Feature data 507 of one pixel is obtained from the feature data 506 of two pixels by taking the maximum value or the average value similarly to the spatial pooling. As a whole, this is the process of calculating feature data 508 of one channel from the feature data 505 of two channels.

In a case where the max pooling in the channel direction is performed, learning can be performed by a method similar to a case where the max pooling in the spatial direction is performed. That is, with respect to each pixel position of feature data, a channel in which the maximum value is taken is stored. In the learning of a neural network, first, inference is performed. Next, a coefficient is updated according to whether the result of the inference is correct or incorrect. At this time, a virtual channel left through max pooling when the inference is performed is stored, and a coefficient used to obtain the virtual channel is updated.

The feature data memory 403 holds input feature data and output feature data. The feature data memory 403 transfers an input feature block to the convolution layer processing unit 401 and receives an output feature block from the pooling layer processing unit 402. The feature data memory 403 sets the received output feature data as the next input feature data and thereby can sequentially calculate feature data of the subsequent layer.

The control unit 404 assigns a coefficient to the convolution layer processing unit 401. The control unit 404 holds a network parameter inside and assigns a coefficient based on the network parameter.

The number of coefficients to be assigned by the control unit 404 is switched based on a network parameter. For example, in the network illustrated in FIG. 2, the number of channels $N_{CH}$ in the layer C1 is four, and the number of channels $N_{CH}$ in the layer P1 is eight. In this case, the number of connections of the channels between the layers C1 and P1 is 32. Thus, the control unit 404 assigns a coefficient corresponding to each of the 32 combinations of the channels to the convolution layer processing unit 401.

Figure 6:
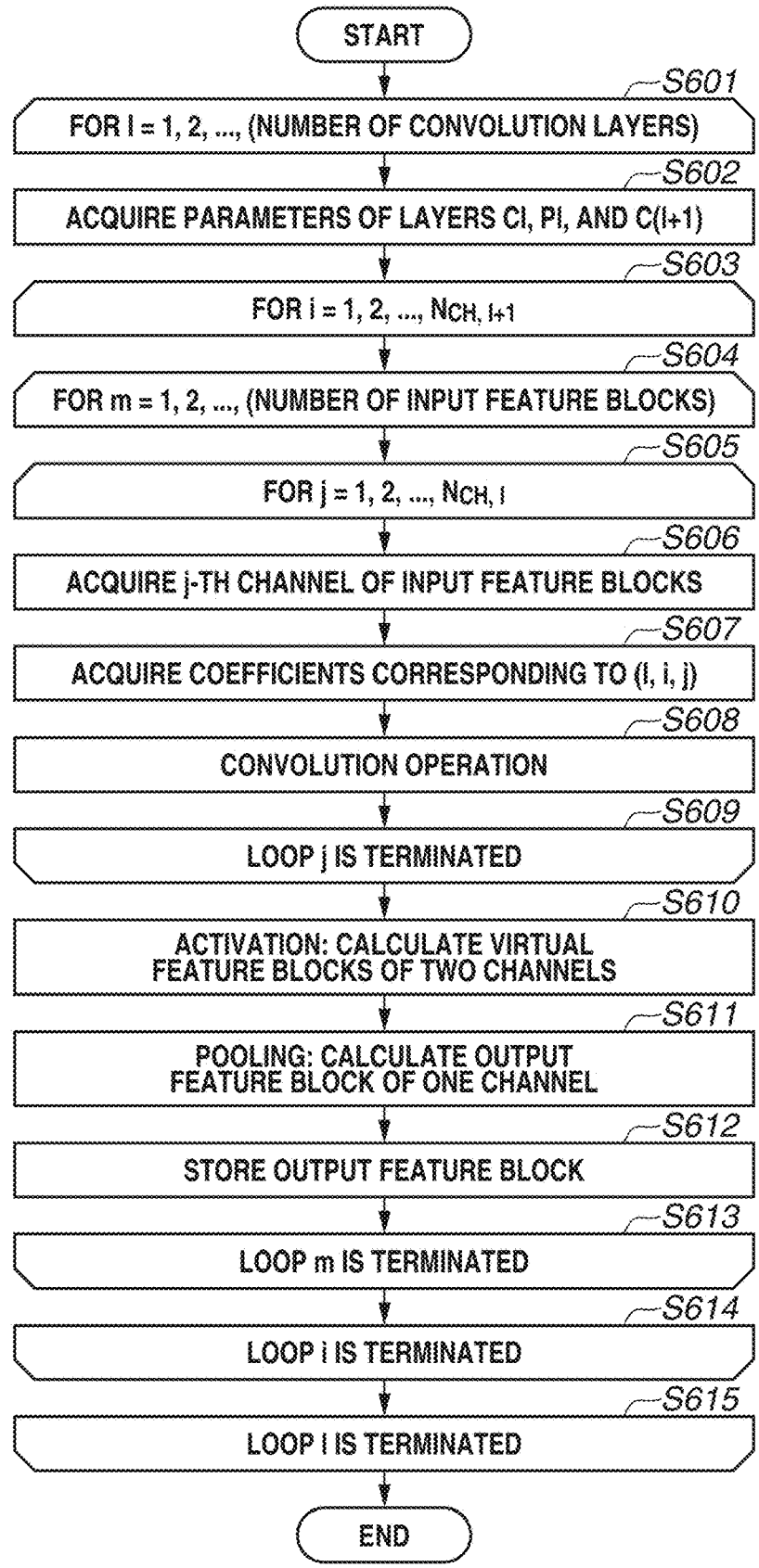
FIG. 6 is a flowchart illustrating order of processing performed by the feature data processing unit according to the first exemplary embodiment.

FIG. 6 illustrates a flowchart in a case where the feature data processing unit 305 having the configuration illustrated in FIG. 4 processes the network illustrated in FIG. 2. In a series of processes, the feature data processing unit 305 calculates feature data 205 of the layer C3 as the last stage from feature data 201 of the layer C1 as the first stage, as the result of processing corresponding to the entirety of the network illustrated in FIG. 2.

The processing for the entire network illustrated in FIG. 2 is achieved by four loops in output layer units, output channel units, feature block units, and input channel units.

An example is given below, where the feature data processing unit 305 having the configuration illustrated in FIG. 4 processes the network illustrated in FIG. 2. Based on the example, the details of steps in the flowchart in FIG. 6 are described.

In step S601, the loop in output layer units is started. In each loop, virtual feature data of one layer and output feature data of one layer are calculated. Thus, the number of turns of the loop is the number of convolution layers except for the last stage. For example, in the network illustrated in FIG. 2, since the layers C1 and C2 are processed, the number of turns of the loop is two. Input feature data, virtual feature data, and output feature data to be processed in the first loop are feature data of layers Cl, Pl, and C(l+1), respectively.

In step S602, the control unit 404 acquires parameters of the layers as the processing targets and starts transmitting coefficients to the convolution layer processing unit 401. In the network illustrated in FIG. 2, the control unit 404 acquires the numbers of channels in the layers Cl and Pl and determines the number of coefficients to be transmitted to the convolution layer processing unit 401.

In step S603, the loop for each output channel unit is started. The output feature data, i.e., the feature data of the layer C(l+1), is calculated with respect to each channel. Thus, the number of turns of the loop is the number of channels $N_{CH,l+1}$ in the layer C(l+1). For example, in the network illustrated in FIG. 2, the number of turns of the loop is always four.

In step S604, the loop for each feature block unit is started. The number of turns of the loop is equal to the number of blocks included in the input feature data. In an m-th loop, for example, an m-th block in order of raster scanning is processed.

In step S605, the loop for each input channel unit is started. The input feature data, i.e., the feature data of the layer Cl, is given with respect to each channel. Thus, the number of turns of the loop is the number of channels $N_{CH,l}$ in the layer Cl. In the network illustrated in FIG. 2, the number of turns of the loop is always four. In the loop for each input channel unit, the cumulative sum of the results of the convolution operation is obtained. The result of the cumulative sum is stored in a buffer included in the convolution layer processing unit 401. The buffer included in the convolution layer processing unit 401 is initialized in step S605.

In step S606, one channel of input feature blocks is read from the feature data memory 403. The read input feature block is given to the convolution layer processing unit 401.

In step S607, the convolution layer processing unit 401 acquires coefficients to be used in the feature extraction process from the control unit 404. The coefficients to be acquired are determined based on the layers and the channels of feature blocks to be calculated. The coefficients, therefore, depend on (l, i, j). The convolution layer processing unit 401 calculates the virtual feature data by two channels. Thus, the number of coefficients to be acquired in step S607 is also two.

In step S608, using the input feature block of one channel and the two coefficients acquired in step S607, the convolution layer processing unit 401 performs the convolution operation, thereby obtaining the results of the convolution operation corresponding to two channels. The convolution layer processing unit 401 make an addition with respect to each of the results of the convolution operation corresponding to two channels and holds the cumulative sum in the loop in input channel units, in the buffer.

In step S609, the loop in input channel units is terminated. By repeating the above, the cumulative sum of the results of the convolution operation on all the input channels is obtained.

In step S610, the convolution layer processing unit 402 performs the activation process, thereby calculating virtual feature blocks of two channels from the cumulative sum of the results of the convolution operation corresponding to two channels obtained in step S609.

In step S611, the pooling layer processing unit 402 performs the channel direction pooling, thereby calculating an output feature block corresponding to one channel from the virtual feature blocks corresponding to two channels. The calculated output feature block is given to the feature data memory 403.

In step S613, the loop in feature block units is terminated. By repeating the above, all the blocks of the output feature data are stored in the feature data memory 403.

In step S614, the loop in output channel units is terminated. By repeating the above, the output feature blocks of all the channels are stored in the feature data memory 403.

In step S615, the loop in output layer units is terminated. By repeating the above, feature data of the last stage of the network illustrated in FIG. 2, i.e., the layer C3, is stored in the feature data memory 403.

The feature data processing unit 305 having the configuration illustrated in FIG. 4 executes the procedure according to the flowchart illustrated in FIG. 6, whereby it becomes possible to enhance the recognition performance of the neural network without increasing the capacity of the feature data memory 403. As described above, by setting the number of channels in each layer to be greater, it becomes possible to enhance the recognition performance of the neural network. A description is given below of a mechanism for increasing the number of channels without increasing the usage of the feature data memory 403, taking as an example a case where the feature data of the layer Pl and the layer C(l+1) is calculated from the feature data of the layer Cl. For generalization, similarly to FIG. 1, the ratio of the number of virtual channels to the number of output channels is represented as a.

Figure 7:
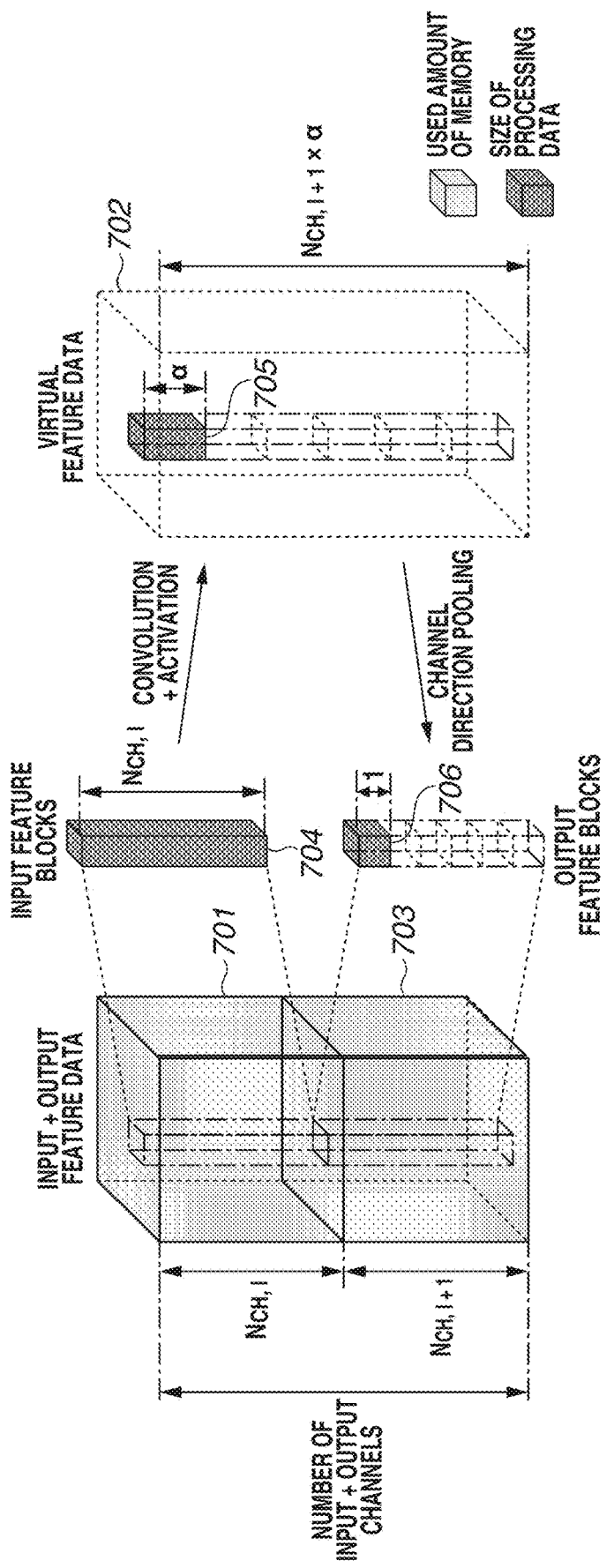
FIG. 7 is a diagram illustrating a relationship between feature data processing and usage of a memory according to the first exemplary embodiment.

FIG. 7 illustrates the relationship between feature data and the usage of the memory in a case where output feature data is calculated from input feature data. According to the flowchart illustrated in FIG. 6, first, the feature data processing unit 305 having the configuration illustrated in FIG. 4 performs the feature extraction process on input feature blocks 704, thereby calculating virtual feature blocks 705 of a channels. Next, the feature data processing unit 305 performs the channel reduction process on the virtual feature blocks 705 of a channels, thereby calculating an output feature block 706 of one channel. By repeating the above, output feature data 703 is calculated from input feature data 701.

To make the feature data memory 403 smaller, it is necessary to make the numbers of channels $N_{CH,l}$ and $N_{CH,l+1}$ of the input feature data 701 and the output feature data 703, respectively, smaller. In the procedure according to the flowchart illustrated in FIG. 6, to calculate the output feature data 703 of all the channels, it is necessary to store the input feature data 701 of all the channels in the feature data memory 403 in advance. Thus, the capacity required for the feature data memory 403 is the maximum value when the sum of the data sizes of the input feature data 701 and the output feature data 703 are obtained for each convolution layer. The data size of feature data of each layer is proportional to the number of channels. In a case of the network illustrated in FIG. 2, the capacity required for the feature data memory 403 corresponds to eight channels for the input and output feature data together.

Meanwhile, even if the number of channels of virtual feature data 702 is set to be greater, the usage of the feature data memory 403 does not necessarily increase. In the procedure according to the flowchart illustrated in FIG. 6, of the virtual feature data 702, only the virtual feature blocks 705 of α channels need to be temporarily held. Thus, the data size of the virtual feature data 702 to be held corresponds to α channels of the virtual feature blocks, regardless of the number of channels $N_{CH,l+1}$ of the output feature data 703. The data size of the virtual feature data 702 to be held can be made sufficiently small relative to the capacity of the feature data memory 403 by a method for setting the number of input feature blocks to be greater or setting α to be smaller.

Based on the above, by setting α to be greater than 1 and making the number of virtual channels $\alpha \times N_{CH,l+1}$ greater than the number of output channels, it is possible to enhance the recognition performance without increasing the capacity of the feature data memory 403. As an example, in the case of the feature data processing that does not uses the channel direction pooling, when the capacity of a feature data memory corresponds to eight channels of feature data, and the number of channels $N_{CH}$ of input feature data is four, feature data of the next layer to be obtained by feature extraction include four channels at a maximum. On the other hand, the data processing apparatus according to the present disclosure can process a network including the feature extraction process on four channels×eight channels as shown in FIG. 2, for example.

Similarly to the first exemplary embodiment, the second exemplary embodiment is directed to enhancing the recognition accuracy of a neural network without increasing the usage of a feature data memory. Additionally, the second exemplary embodiment is directed to achieving as high recognition performance as possible while overcoming the constraints imposed on the capacity of a coefficient memory and the processing time. Examples of a feature data processing apparatus and a feature data processing method scalable in a trade-off between the recognition accuracy and the usage of the coefficient memory and the processing time are illustrated below. Similarly to the first exemplary embodiment, the ratio α of the number of virtual channels to the number of output channels is set to two.

Figure 8:
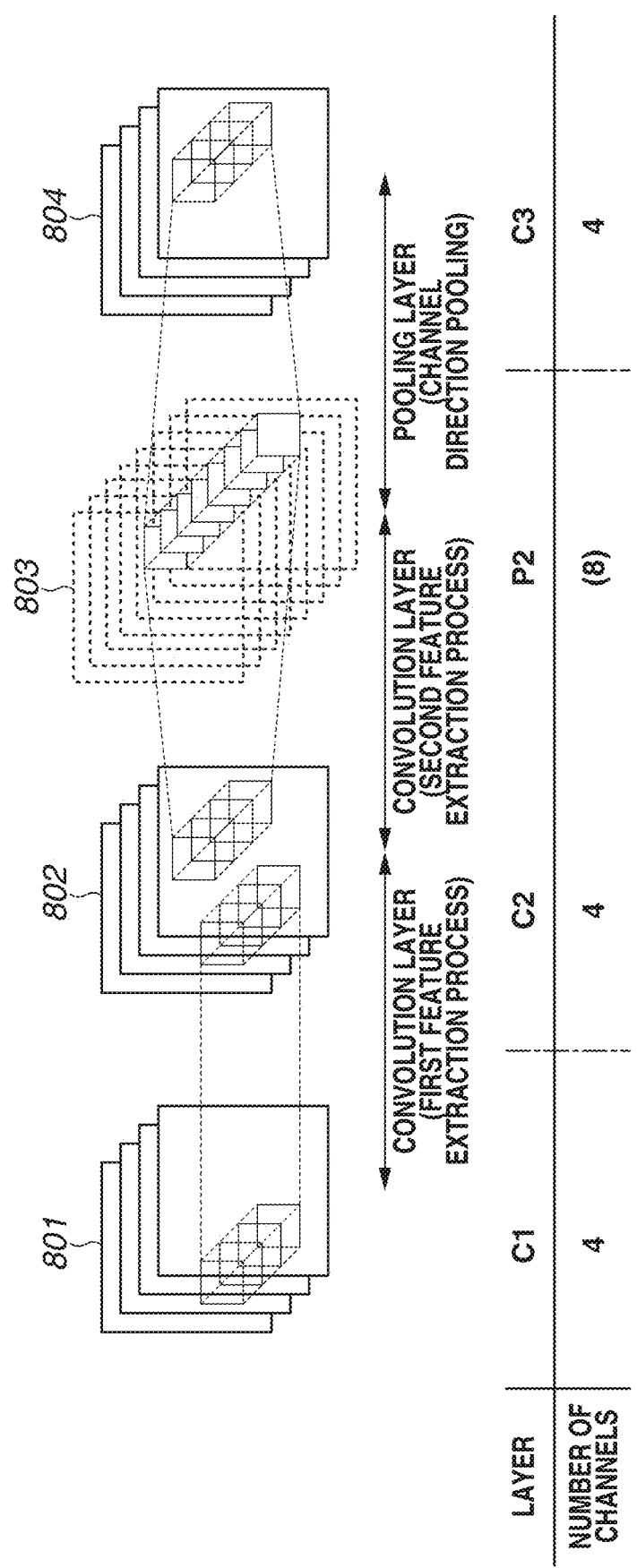
FIG. 8 is a diagram illustrating an example of a structure of a processing target network according to the second exemplary embodiment.

FIG. 8 illustrates an example of the structure of a network as a processing target. The network illustrated in FIG. 8 includes three convolution layers, namely layers C1, C2, and C3. Each number of channels $N_{CH}$ of feature data included in the layers C1, C2, and C3 is four. The network also includes a pooling layer P2 between the layers C2 and C3.

Similarly to the first exemplary embodiment, the numbers of pixels per channel of feature data are all equal, and the bit widths are all equal.

Similarly to the first exemplary embodiment, feature data 802 to 804 of the respective layers are obtained through a feature extraction process or a channel reduction process. To obtain the feature data 802 of the layer C2 from feature data 801 of the layer C1, similarly to the first exemplary embodiment, a convolution operation corresponding to formula (1) and activation are performed. This is referred to as a "first feature extraction process". To calculate the feature data 803 of the layer P2 from the feature data 802 of the layer C2, a feature extraction process different from the first feature extraction process is used. This is referred to as a "second feature extraction process". Meanwhile, to calculate the feature data 804 of the layer C3 from the feature data 803 of the layer P2, similarly to the first exemplary embodiment, the channel direction pooling is performed.

There are two differences between the networks illustrated in FIGS. 2 and 8. The first difference is the presence or absence of a pooling layer. In the network illustrated in FIG. 2, next to a convolution layer, always comes a pooling layer. On the other hand, in the network illustrated in FIG. 8, convolution layers are present in a row. Thus, in the second exemplary embodiment, there is a case where the feature data processing unit 305 having a configuration described below performs only a feature extraction process on input feature blocks. The second difference is that there are two types of feature extraction processes. The second feature extraction process is intended to suppress an increase in the usage of the coefficient memory and the processing time.

Figure 9:
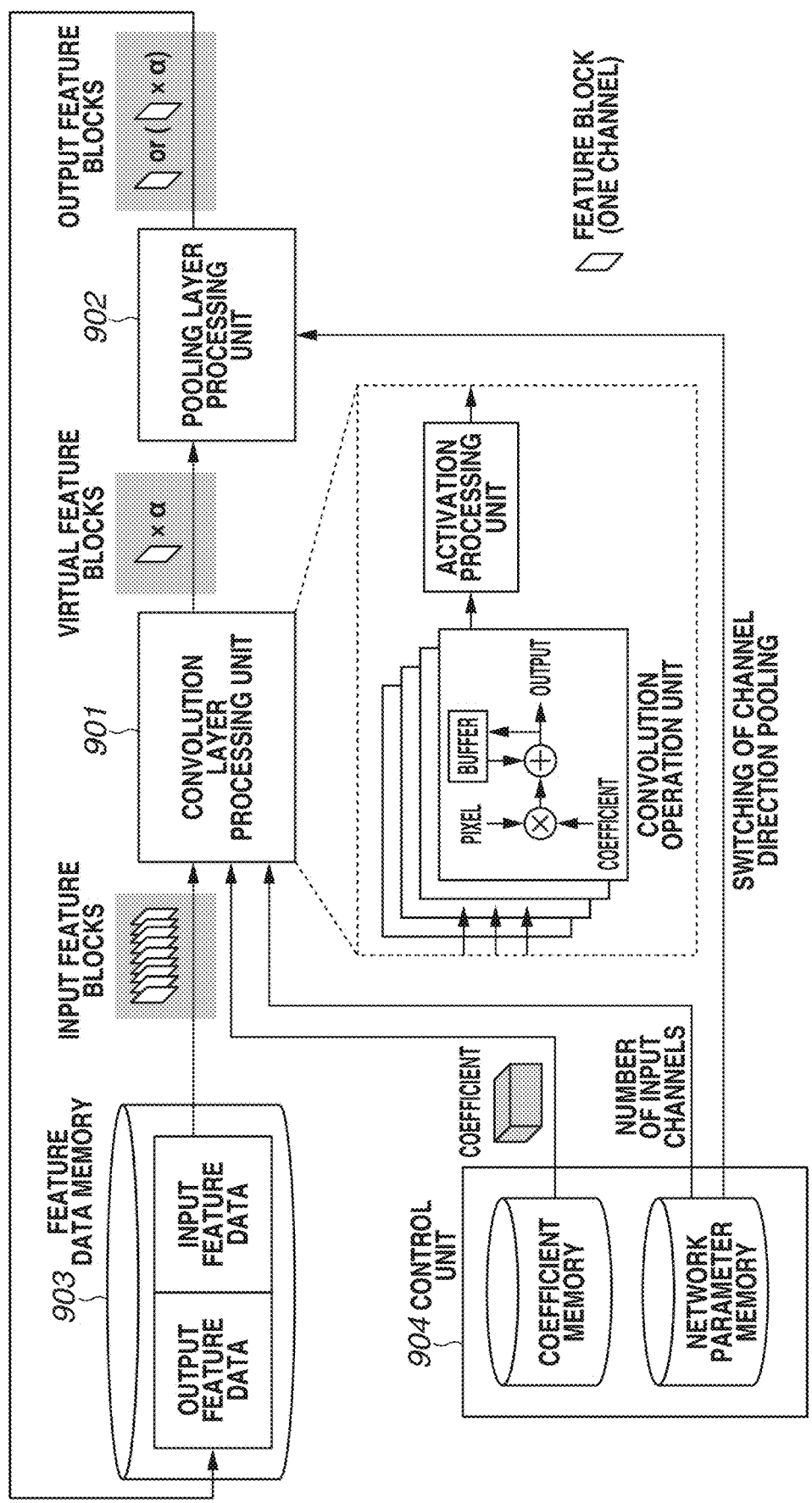
FIG. 9 is a block diagram illustrating a configuration of a feature data processing unit according to the second exemplary embodiment.

FIG. 9 illustrates the configuration of the feature data processing unit 305 according to the second exemplary embodiment. The feature data processing unit 305 includes, as components corresponding to those with the same names in the first exemplary embodiment, a convolution layer processing unit 901, a pooling layer processing unit 902, a feature data memory 903, and a control unit 904. The convolution layer processing unit 901 performs the feature extraction processes, and the pooling layer processing unit 902 performs the channel reduction process.

The control unit 904 illustrated in FIG. 9 is different from the control unit 404 illustrated in FIG. 4 in that the control unit 904 gives a control signal to other components. Based on a control signal, the convolution layer processing unit 901 and the pooling layer processing unit 902 switch the processing. The details of the components are described below, focusing on the differences from the first exemplary embodiment.

The convolution layer processing unit 901 performs the two types of feature extraction processes, namely the first feature extraction process and the second feature extraction process. Based on the control signal given by the control unit 904, it is determined which of the two feature extraction processes is to be performed.

To obtain the feature data 803 of the layer P2 in the network illustrated in FIG. 8, the second feature extraction process is used, whereby it is possible to reduce the usage of the coefficient memory and the processing time. In the first feature extraction process, similarly to the first exemplary embodiment, virtual feature data is calculated from all the channels of input feature data. Meanwhile, in the second feature extraction process, the convolution operation is omitted with respect to some channels of the input feature data. Input channels from which the convolution operation is to be omitted are determined by a control signal given by the control unit 904 and can be changed for each output channel. In the second exemplary embodiment, in a case where the feature data 802 of the layer C2 illustrated in FIG. 8 is input feature data, the feature data 803 of the layer P2 is calculated using only three channels selected from among four channels in advance for each output channel. Hereinafter, the number of channels used to calculate virtual feature data will be referred to as "the number of feature extraction channels". The ratio of the number of feature extraction channels to the number of input channels is represented as β.

The pooling layer processing unit 902 can make the switch to determine whether to perform the channel direction pooling. Based on a control signal given by the control unit 904, it is determined whether to perform the channel direction pooling.

To obtain the feature data 802 of the layer C2 in the network illustrated in FIG. 8, the pooling layer processing unit 902 does not perform the channel direction pooling. In a case where the channel direction pooling is to be performed, the pooling layer processing unit 902 receives virtual feature data of α channels and calculates output feature data of one channel. On the other hand, in a case where the channel direction pooling is not to be performed, the pooling layer processing unit 902 receives virtual feature data of α channels and outputs the virtual feature data of α channels as it is as output feature data of α channels. That is, the result of performing only the feature extraction process on the feature data 801 of the layer C1 can be regarded as output feature data and held as the feature data 802 of the layer C2 in the feature data memory 903.

The control unit 904 gives a control signal to the convolution layer processing unit 901 and the pooling layer processing unit 902. Similarly to a coefficient, a control signal is switched based on a network parameter. For example, to calculate the feature data 802 of the layer C2 from the feature data 801 of the layer C1, the convolution layer processing unit 901 performs the first feature extraction process, and the pooling layer processing unit 902 does not perform the channel direction pooling. On the other hand, to calculate the feature data 803 of the layer P2 and the feature data 804 of the layer C3 from the feature data 802 of the layer C2, the convolution layer processing unit 901 performs the second feature extraction process, and the pooling layer processing unit 902 performs the channel direction pooling. The control unit 904 may be given a group of control signals determined in advance as network parameters, sequentially reference the network parameters, and give control signals.

Figure 10:
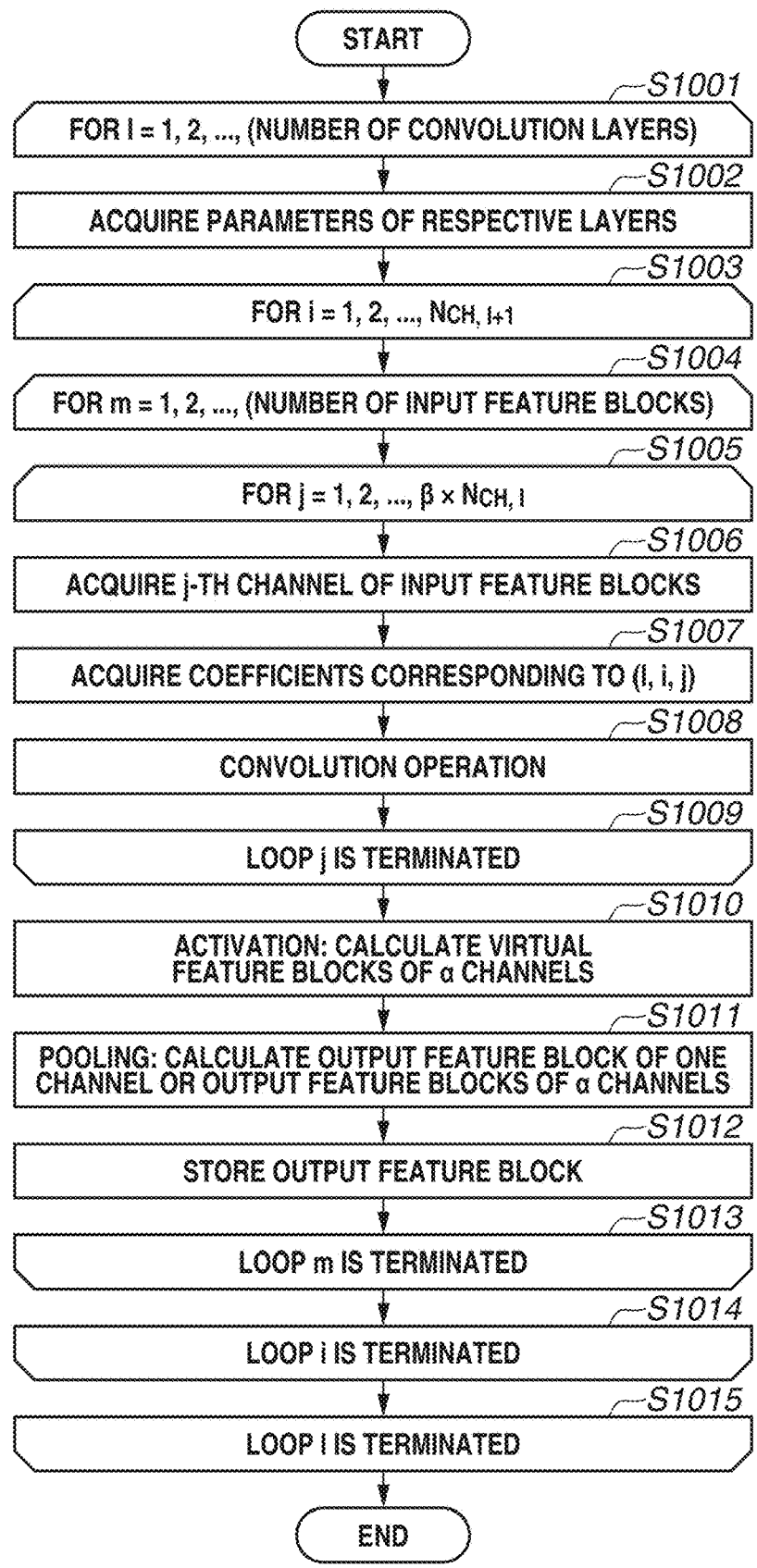
FIG. 10 is a flowchart illustrating order of processing performed by the feature data processing unit according to the second exemplary embodiment.

FIG. 10 illustrates a flowchart in a case where the feature data processing unit 305 processes the network illustrated in FIG. 8. Steps S1001 to S1015 in the flowchart in FIG. 10 correspond to steps S601 to S615 according to the first exemplary embodiment. A description is given below, taking as an example a case where the feature data processing unit 305 illustrated in FIG. 9 handles the network illustrated in FIG. 8, and focusing on the differences from the first exemplary embodiment. For generalization, in the flowchart illustrated in FIG. 10, the ratio of the number of virtual channels to the number of output channels is represented as α.

In step S1002, parameters of each layer corresponding to input feature data to output feature data are acquired. There are a case where the number of layers for which parameters are acquired is three, and a case where the number of layers for which parameters are acquired is two. That is, in a case where the channel direction pooling is to be performed, parameters of layers Cl, Pl, and C(l+1) are acquired, while in a case where the channel direction pooling is not to be performed, parameters of the layers Cl and C(l+1) are acquired.

In step S1005, similarly to step S605, the loop for each input channel unit is started. In a case where the second feature extraction process is used, the number of turns of the loop is the number of feature extraction channels $\beta \times N_{CH,l}$ and therefore is smaller than the number of input channels $N_{CH,l}$.

In step S1011, based on a control signal given by the control unit 904, the pooling layer processing unit 902 performs the channel direction pooling, thereby calculating output feature data of one channel. Alternatively, the pooling layer processing unit 902 omits the channel direction pooling and transfers virtual feature data of α channels as output feature data of α channels to the data integration unit 905.

Similarly to the first exemplary embodiment, in the network illustrated in FIG. 8, by setting α to be greater than 1 and making the number of channels $\alpha \times N_{CH,l+1}$ in the layer P2 greater, it is possible to enhance the recognition performance without increasing the capacity of the feature data memory 903. In a case where the feature data 804 of the layer C3 is calculated from the feature data 802 of the layer C2, the relationship illustrated in FIG. 7 is maintained between the number of channels and the usage of the memory. That is, the data size of virtual feature blocks to be held in the buffer is sufficiently smaller than the capacity of the feature data memory 903, and the usage of the feature data memory 903 does not depend on a.

In the second exemplary embodiment, the processing in the convolution layer processing unit 901 and the pooling layer processing unit 902 is switched to realize the feature data processing unit 305 scalable in a trade-off between the recognition performance, and the usage of the coefficient memory and the processing time. Using the network illustrated in FIG. 8 as an example, a description is given below of a mechanism for suppressing an increase in the usage of the coefficient memory and the processing time by controlling the number of times of the convolution operations. The feature data processing unit 305 illustrated in FIG. 9 reduces the number of times of the convolution operations in the feature extraction processes, whereby it is possible to reduce the usage of the coefficient memory and the processing time. The usage of the coefficient memory is proportional to the number of coefficients in the feature extraction processes, and the number of coefficients is proportional to the number of times of the convolution operations. Meanwhile, since the time taken for the convolution operation accounts for the majority of the processing time, the processing time can be shortened by reducing the number of times of the convolution operations.

The number of times of the convolution operations in the feature extraction processes is proportional to the number of input channels $N_{CH,l}$ and the number of virtual channels $\alpha \times N_{CH,l+1}$. By switching the processing of the convolution layer processing unit 901, the feature data processing unit 305 illustrated in FIG. 9 uses the number of feature extraction channels $\beta \times N_{CH,l}$ instead of the number of input channels $N_{CH,l}$. Meanwhile, by switching the processing of the pooling layer processing unit 902, the feature data processing unit 305 illustrated in FIG. 9 controls the number of virtual channels $\alpha \times N_{CH,l+1}$.

The convolution layer processing unit 901 uses the second feature extraction process and thereby can use the number of feature extraction channels $\beta \times N_{CH,l}$ instead of the number of input channels $N_{CH,l}$. In the second feature extraction process, virtual feature data is calculated using only $\beta \times N_{CH,l}$ channels of input feature data of $N_{CH,l}$ channels. For example, in the network illustrated in FIG. 8, in the second feature extraction process, input feature data of three channels selected from among four channels in advance for each output channel is used. That is, $\beta=3/4$. This can reduce the number of times of the convolution operations for calculating the feature data 803 of the layer P2 to 0.75 times in comparison with a case where the first feature extraction process is used.

Meanwhile, the pooling layer processing unit 902 switches between the presence and absence of the channel direction pooling to control the number of virtual channels $\alpha \times N_{CH,l+1}$. The feature extraction process for calculating virtual feature data of $\alpha \times N_{CH,l+1}$ channels is performed on only some layers, and the number of virtual channels is reduced to $N_{CH,l+1}$ in other layers. For example, in the network illustrated in FIG. 9, only in a case where the feature data 803 of the layer P2 is to be calculated, virtual feature data of eight channels is calculated, and the channel direction pooling is performed. This can reduce the number of times of the convolution operations for calculating the feature data 802 of the layer C2 to 0.5 times in comparison with a case where the channel direction pooling is always performed as in the first exemplary embodiment.

Based on the above, it is possible to suppress an increase in the usage of the coefficient memory and the processing time in a case where $\alpha$ is greater than one. By appropriately controlling the number of input channels $N_{CH,l}$ and the number of virtual channels $\alpha \times N_{CH,l+1}$, it is possible to achieve higher recognition performance while overcoming the constraints imposed on the capacity of the coefficient memory and the processing time. Information required to control the convolution layer processing unit 901 and the pooling layer processing unit 902 is given as network parameters to the control unit 904 in advance.

Other Exemplary Embodiments

Figure 11:
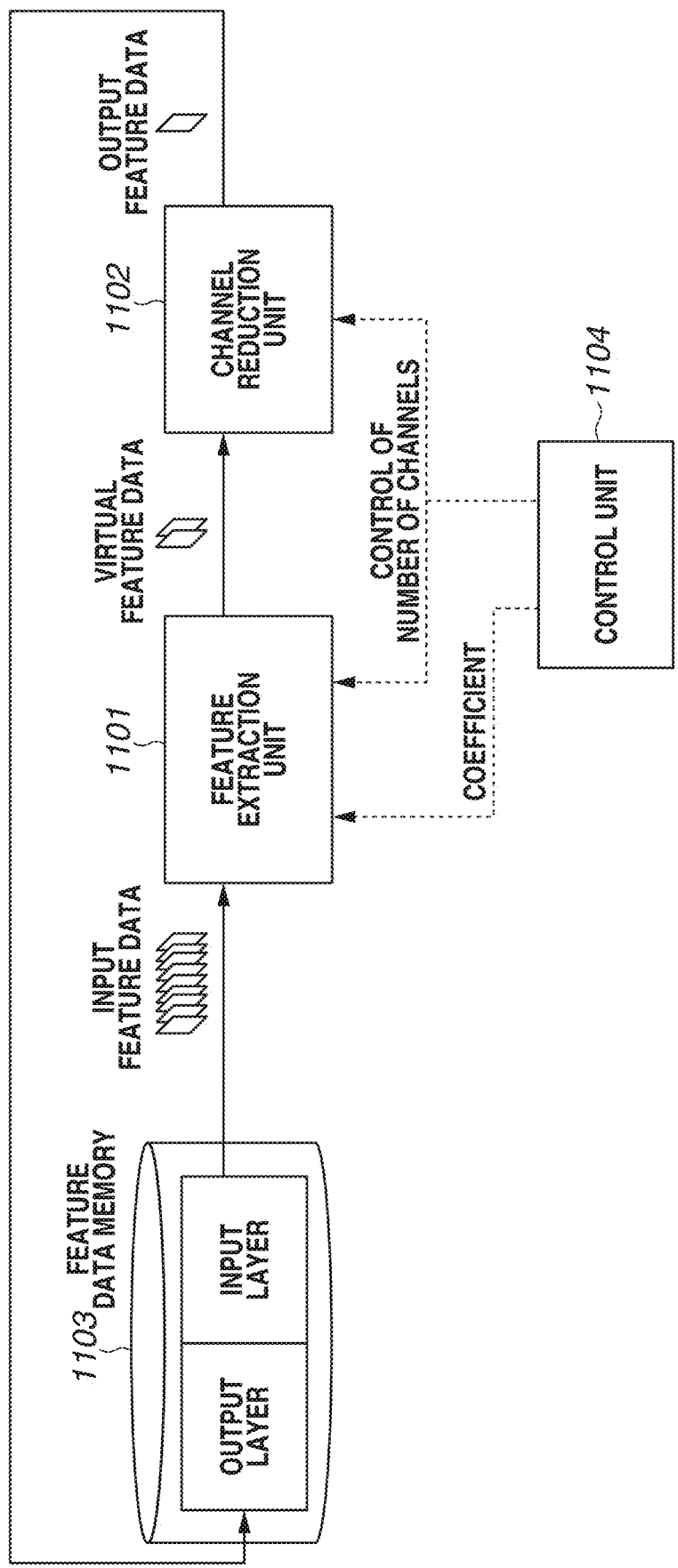
FIG. 11 is a block diagram illustrating a configuration of a feature data processing unit according to other exemplary embodiments.

Other exemplary embodiments are described based on a feature data processing apparatus having a configuration illustrated in FIG. 11. An extraction unit 1101 and a channel reduction unit 1102 correspond to the convolution layer processing unit 401 and the pooling layer processing unit 402, respectively, in the first exemplary embodiment. Also in the other exemplary embodiments, processing is performed according to the flowchart illustrated in FIG. 6 or 10.

In the first and second exemplary embodiments, the feature data processing unit 305 having the configurations illustrated in FIGS. 4 and 9 calculates an output feature block for each channel. On the other hand, the feature data processing apparatus having the configuration illustrated in FIG. 11 may calculate output feature blocks with respect to a plurality of channels in parallel. For example, in a case where output feature blocks of No channels are to be calculated in parallel, the number of turns of the loop for each output channel unit starting from step S603 is $N_{CH,l+1}/N_O$. The number of channels of virtual feature blocks to be calculated in step S610 is $\alpha \times N_O$. The same applies to the flowchart illustrated in FIG. 10.

In the second exemplary embodiment, the convolution layer processing unit 901 calculates virtual feature data using only some channels of input feature data, thereby reducing the usage of the coefficient memory. Alternatively, to reduce the usage of the coefficient memory, a single coefficient may be used for a plurality of input channels in the feature extraction processes. For example, in a case where coefficients to be used are switched every two channels of input feature data, the number of times of the convolution operations in the feature extraction processes does not change, but the required number of coefficients is ½.

In the first and second exemplary embodiments, the feature data processing unit 305 is realized by dedicated hardware having the configurations illustrated in FIGS. 4 and 9. On the other hand, the steps in the flowchart illustrated in FIG. 10 may be carried out using software by the CPU 306 within the data processing apparatus illustrated in FIG. 3. In this case, the RAM 308 within the data processing apparatus illustrated in FIG. 3 may be used as a feature data memory.

In the first and second exemplary embodiments, the feature data processing unit 305 having the configurations illustrated in FIGS. 4 and 9 performs the channel direction pooling. On the other hand, to further reduce the data size of feature data, the spatial direction pooling illustrated in FIG. 5 may be performed along with the channel direction pooling. In this case, the spatial direction pooling is performed at any timing from immediately after step S609 to immediately before step S612 in the flowchart illustrated in FIG. 6. The same applies to the flowchart illustrated in FIG. 10. The spatial pooling is performed by the extraction unit 1101, the channel reduction unit 1102, or another component connected to the stage subsequent to the channel reduction unit 1102.

In order to make the bit width of feature data smaller and reducing the data size, immediately after the activation process, the extraction unit 1101 may perform the process of converting the bit width of the feature data into a value specified by the control unit 1104. This is referred to as a "quantization process". Alternatively, the extraction unit 1101 may perform the quantization process instead of the activation process. In this case, the quantization process is performed at any timing from immediately after step S609 to immediately before step S612 in the flowchart illustrated in FIG. 6. The same applies to the flowchart illustrated in FIG. 10. The quantization process is performed by the extraction unit 1101, the channel reduction unit 1102, or another component connected to the stage subsequent to the channel reduction unit 1102.

In the first and second exemplary embodiments, the activation process and the channel direction pooling are performed in the above order. On the other hand, the activation process, the quantization process, the channel direction pooling, and the spatial direction pooling may be performed in any order at any timing from immediately after step S609 to immediately before step S612 in the flowchart illustrated in FIG. 6.

In the first and second exemplary embodiments, the feature data processing unit 305 having the configurations illustrated in FIGS. 4 and 9 uses output feature data as it is as next input feature data. On the other hand, the channel reduction process performed by the channel reduction unit 1102 may be regarded as the compression of feature data, and data obtained by decompressing output feature data may be used as next input feature data. In this case, a feature data memory 1103 or the extraction unit 1101 may perform the decompression process. Examples of the decompression process corresponding to channel direction max pooling include the process of estimating, based on the output feature data, virtual feature data before being subjected to the channel reduction process. For example, the output feature data of one channel obtained by compression is decompressed into the input feature data of two channels including one channel having the same pixel value and one channel having a smaller pixel value. That is, the virtual feature data of two channels which gives max pooling results equal to the output feature data is estimated and used as the input feature data. Consequently, the input feature data of two channels is obtained with respect to each channel for the usage of the feature data memory 1103. If the input feature data of two channels obtained by the decompression succeeds in correctly estimating the virtual feature data of two channels before being subjected to the compression, the input feature data has a greater amount of information than the input feature data of one channel obtained without using compression and decompression. Based on the above, by using compression and decompression, more excellent recognition accuracy may be obtained without increasing the usage of the feature data memory 1103.

In the second exemplary embodiment, the control unit 904 determines a control signal to enhance the recognition performance as much as possible while overcoming the constraints imposed on the usage of the coefficient memory and the processing time. On the other hand, the control unit 1104 may determine a control signal to make the usage of the coefficient memory and the processing time as small as possible while achieving required recognition performance. Alternatively, the control unit 1104 may reference and give a saved control signal which is determined in advance to satisfy the above requirements.

In the first and second exemplary embodiments, the pooling layer processing units 402 and 902 each calculate the output feature data of one channel based on the virtual feature data of two channels. On the other hand, the ratio of the numbers of input and output channels in the channel direction pooling may be set to a ratio other than 2:1. That is, the ratio $\alpha$ of the number of virtual channels to the number of output channels may be set to a value other than 2. $\alpha$ may be independently determined for each layer.

In the second exemplary embodiment, the control unit 904 switches between the presence and absence of the channel direction pooling based on a network parameter for each layer. On the other hand, the control unit 1104 may control a by switching control of the channel reduction unit 1102 in the processing of one layer. As described above, a is the ratio of the number of channels of virtual feature data to the number of channels of output feature data. For example, in the channel direction pooling in the first and second exemplary embodiments, the output feature data of four channels is generated from the virtual feature data of eight channels. Thus, $\alpha=2$. On the other hand, if the first four channels are processed by performing the channel direction pooling, and the second four channels are processed without performing the channel direction pooling, the output feature data of six channels is calculated from the virtual feature data of eight channels. Thus, $\alpha=4/3$. In this case, the control unit 904 switches a control signal at any timing from immediately after step S1003 to immediately before step S1011.

In the first exemplary embodiment, the pooling layer processing unit 402 sequentially performs the channel reduction process on the virtual feature data of two channels calculated through the feature extraction process. Thus, the number of virtual channels received by the channel reduction unit 1102 is two. If serially numbered indices are assigned to channels in a pooling layer, the channel reduction unit 1102 uses channels 1 and 2 in the first channel reduction process and uses channels 3 and 4 in the second channel reduction process. In this case, a number of increase in indices is two. The number of increase in indices is referred to as a "stride". On the other hand, the stride does not need to match the number of virtual channels received in the channel reduction process. For example, the channel reduction unit 1102 may use the channels 1 and 2 in the first channel reduction process, use the channels 2 and 3 in the second channel reduction process, and use the channels 3 and 4 in the third channel reduction process. In this case, the stride is one, and does not match the number of virtual channels received by the channel reduction unit 1102, i.e., two. In this case, the value of the stride may be given to the channel reduction unit 1102 by the control unit 1104.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosures not limited to the disclosed exemplary embodiments. The scope of the following claims is to be accorded the broadest interpretation so as to encompass all such modifications and equivalent structures and functions.

This application claims the benefit of Japanese Patent Application No. 2019-041447, filed Mar. 7, 2019, which is hereby incorporated by reference herein in its entirety.

What is claimed is:

1. A data processing apparatus for executing data processing using a neural network including a plurality of hierarchal layers, the data processing apparatus comprising:
   one or more processors; and
   one or more memories coupled to the one or more processors, the one or more memories having stored thereon instructions which, when executed by the one or more processors, cause the apparatus with respect to an intermediate layer in the plurality of layers to:
   read out output feature data of a preceding layer of the intermediate layer from a feature data memory as input feature data of the intermediate layer;
   calculate intermediate feature data of the intermediate layer from the input feature data of the intermediate layer with making a number of channels of the intermediate feature data greater than that of the input feature data of the intermediate layer;

reduce the number of channels of the calculated intermediate feature data to generate output feature data of the intermediate layer; and store the output feature data of the intermediate layer in the feature data memory as input feature data of a succeeding layer of the intermediate layer, wherein the number of channels of the input feature data and the number of channels of the output feature data are determined in advance based on a bit width of data and a capacity of the feature data memory.

2. The data processing apparatus according to claim 1, wherein the number of channels of the intermediate feature data is determined in advance based on the number of channels of the input feature data and the number of channels of the output feature data.

3. The data processing apparatus according to claim 1, wherein the number of channels of the intermediate feature data and the number of channels of the output feature data are determined with respect to the plurality of layers.

4. The data processing apparatus according to claim 1, wherein the intermediate feature data is calculated using a coefficient.

5. The data processing apparatus according to claim 4, wherein coefficients to be used are fewer than the number of channels of the input feature data.

6. The data processing apparatus according to claim 5, wherein some channels of the input feature data are used to calculate the intermediate feature data.

7. The data processing apparatus according to claim 5, wherein a single coefficient is used multiple times to calculate the intermediate feature data.

8. The data processing apparatus according to claim 1, wherein the output feature data is divided into blocks based on certain sizes and a certain number of channels and the output feature data is sequentially calculated for each block.

9. The data processing apparatus according to claim 1, wherein a bit width of data is specified, and
wherein the intermediate feature data is calculated with being quantized by the bit width.

10. The data processing apparatus according to claim 9, wherein the instructions, when executed by the one or more processors, further cause the apparatus to output, as an output of an activation process, the intermediate feature data quantized by the specified bit width.

11. The data processing apparatus according to claim 1, wherein the instructions, when executed by the one or more processors, further cause the apparatus to perform a process of reducing an amount of data of the output feature data per channel.

12. The data processing apparatus according to claim 1, wherein in reducing the number of channels, pieces of data at the same position in the intermediate feature data of a plurality of channels are grouped together into a single piece of data.

13. The data processing apparatus according to claim 1, wherein every time the intermediate feature data is given, the number of channels of the output feature data to be calculated is switched.

14. The data processing apparatus according to claim 1, wherein based on a stride having a magnitude different from the number of channels of the intermediate feature data used to calculate the output feature data of one channel, the intermediate feature data used to calculate the output feature data is switched.

15. The data processing apparatus according to claim 1, wherein the intermediate feature data is not stored in the feature data memory.

16. A data processing method for executing data processing using a neural network including a plurality of hierarchal layers, the data processing method comprising:

reading out output feature data of a preceding layer of the intermediate layer from a feature data memory as input feature data of the intermediate layer;

calculating intermediate feature data of the intermediate layer from the input feature data of the intermediate layer with making a number of channels of the intermediate feature data greater than that of the input feature data of the intermediate layer;

reducing the number of channels of the calculated intermediate feature data to generate output feature data of the intermediate layer; and storing in the featured data memory the output feature data of the intermediate layer in the feature data memory as input feature data of a succeeding layer of the intermediate layer, wherein the number of channels of the input feature data and the number of channels of the output feature data are determined in advance based on a bit width of data and a capacity of the feature data memory.

17. A non-transitory computer-readable storage medium that stores a program for causing a computer to function as a data processing apparatus for a executing data processing method for data processing using a neural network including a plurality of hierarchal levels, the data processing method comprising:

reading out output feature data of a preceding layer of the intermediate layer from a feature data memory as input feature data of the intermediate layer;

calculating intermediate feature data of the intermediate layer from the input feature data of the intermediate layer with making a number of channels of the intermediate feature data greater than that of the input feature data of the intermediate layer;

reducing the number of channels of the calculated intermediate feature data to generate output feature data of the intermediate layer; and storing in the featured data memory the output feature data of the intermediate layer in the feature data memory as input feature data of a succeeding layer of the intermediate layer, wherein the number of channels of the input feature data and the number of channels of the output feature data are determined in advance based on a bit width of data and a capacity of the feature data memory.

* * * * *